US012725182B2

(12) United States Patent
Hopkins et al.

(10) Patent No.: US 12,725,182 B2
(45) Date of Patent: Sep. 1, 2026

(54) VIRTUAL ADVERTISING BASED ON PHYSICAL LOCATION

(71) Applicant: Micron Technology, Inc., Boise, ID (US)

(72) Inventors: John D. Hopkins, Milpitas, CA (US); Mohad Baboli, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/767,741

(22) Filed: Jul. 9, 2024

(65) Prior Publication Data

US 2025/0037164 A1 Jan. 30, 2025

Related U.S. Application Data

(60) Provisional application No. 63/528,489, filed on Jul. 24, 2023.

(51) Int. Cl.
*G06Q 30/02* (2023.01)
*G06Q 30/0251* (2023.01)

(52) U.S. Cl.
CPC ................................ *G06Q 30/0261* (2013.01)

(58) Field of Classification Search
CPC ............... G06Q 30/02; G06Q 30/0261; G06Q 30/0267; G06Q 30/0254; G06Q 10/067; G06Q 30/0246
See application file for complete search history.

(56) References Cited

U.S. PATENT DOCUMENTS

| | | | | |
|---|---|---|---|---|
| 11,785,161 | B1 | 10/2023 | Suiter et al. | |
| 2013/0317912 | A1* | 11/2013 | Bittner | G06Q 50/01 345/633 |
| 2019/0108682 | A1* | 4/2019 | Spivack | G06Q 30/0277 |
| 2020/0126121 | A1* | 4/2020 | Thomason | G06Q 30/0255 |
| 2021/0106916 | A1 | 4/2021 | Khan et al. | |
| 2024/0112408 | A1* | 4/2024 | Berliner | G02B 27/017 |
| 2024/0134901 | A1 | 4/2024 | Coleman et al. | |
| 2024/0135782 | A1 | 4/2024 | Nelson et al. | |
| 2024/0144949 | A1 | 5/2024 | Yang et al. | |

FOREIGN PATENT DOCUMENTS

WO WO 2013/166360 A2 * 11/2013 ............. G06F 17/00

OTHER PUBLICATIONS

Barrett Ena; Pourang Irani, Spatial Analytic Interfaces Spatial User Interfaces fo In Situ Visual Analytics (English), IEEE Computer Graphics and Application (vol. 37. Issue: 2, 2017, pp. 66-79), Apr. 7, 2017 (Year: 2017).*

* cited by examiner

*Primary Examiner* — Marilyn G Macasiano
(74) *Attorney, Agent, or Firm* — Brooks, Cameron & Huebsch, PLLC

(57) ABSTRACT

Methods, apparatus, and non-transitory machine-readable media associated with virtual advertisements based on physical location are described. An apparatus can include a memory device and a processing device communicatively coupled to the memory device. The processing device can detect a computing device within a first threshold radius of a first physical location and a second threshold radius of a first product, display a virtual advertisement associated with the first product via a user interface of the computing device, and provide the first product for sale via the user interface based on the virtual advertisement.

16 Claims, 5 Drawing Sheets

VIRTUAL ADVERTISING BASED ON PHYSICAL LOCATION

PRIORITY INFORMATION

This application claims the benefit of U.S. Provisional Application No. 63/528,489, filed on Jul. 24, 2023, the contents of which are incorporated herein by reference.

TECHNICAL FIELD

The present disclosure relates generally to apparatuses, non-transitory machine-readable media, and methods associated with virtual advertising based on physical location.

BACKGROUND

A computing device can be, for example, a personal laptop computer, a desktop computer, a smart phone, smart glasses, a tablet, a wrist-worn device, a mobile device, a digital camera, and/or redundant combinations thereof, among other types of computing devices.

Augmented reality (AR) can overlay virtual objects on a real-world (e.g., natural) environment. In some examples, AR can be an interactive experience of a real-world environment where real-world objects are enhanced by computer-generated perceptual information. The AR can mask a portion of the real-world environment and/or add to the real-world environment such that it is perceived as an immersive aspect of the real-world environment. Accordingly, AR can alter a person's perception of a real-world environment.

Virtual reality (VR) is a simulated experience that can be similar to or completely different from the real world. VR can be utilized for entertainment, education, and business, among other applications.

DETAILED DESCRIPTION

Figure 1:
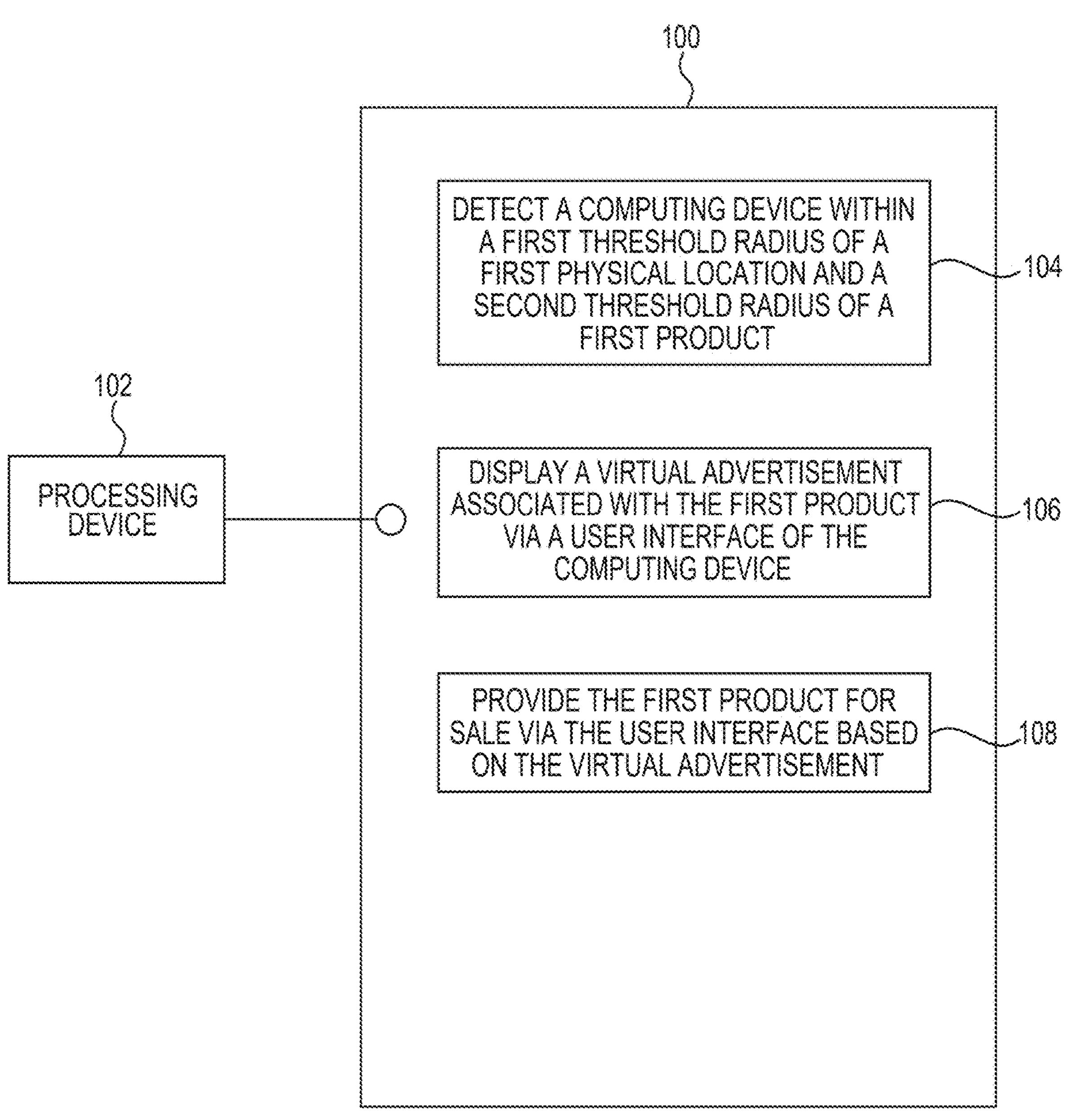
FIG. 1 is a functional diagram representing an apparatus including a processing device in communication with a memory device for virtual advertising based on physical location in accordance with a number of embodiments of the present disclosure.

Apparatuses, machine-readable media, and methods related to virtual advertising based on physical location are described. As the real world becomes more connected to virtual worlds, advertisers may look for ways reach potential customers, both in the real world and a virtual world. For instance, an advertiser may utilize virtual and/or AR to promote items based on a user's habits and previous purchases. A user, for example, may walk through a physical environment such as a grocery store wearing a VR device (e.g., smart glasses), and information can be displayed that is pertinent to the user based on the user's location, orientation, and field of view within the VR or AR environment. An advertiser may enhance product sales, for instance, by serving advertisements directly at a site of a product.

Examples of the present disclosure can allow for the user's and or multiple users' tracking information to be processed using artificial intelligence (AI) in real time to determine what products in which the user or users have interest, and virtual advertisements can be provided to the user using this information.

A user's location can be tracked, for instance, using video recognition, Wi-Fi, Bluetooth, radio frequency identification (RFID), etc. In some examples, a user's orientation such as head position and eye location can be used to determine the user's field of view, and relevant advertisements can be provided to the user in the filed of view and/or based on the user's location within a physical environment.

Examples of the present disclosure can include an apparatus including a memory device and a processing device communicatively coupled to the memory device. The processing device can detect a computing device within a first threshold radius of a first physical location and a second threshold radius of a first product, display a virtual advertisement associated with the first product via a user interface of the computing device, and provide the first product for sale via the user interface based on the virtual advertisement.

In the following detailed description of the present disclosure, reference is made to the accompanying drawings that form a part hereof, and in which is shown by way of illustration how one or more embodiments of the disclosure can be practiced. These embodiments are described in sufficient detail to enable those of ordinary skill in the art to practice the embodiments of this disclosure, and it is to be understood that other embodiments can be utilized and that process, electrical, and structural changes can be made without departing from the scope of the present disclosure.

It is also to be understood that the terminology used herein is for the purpose of describing particular embodiments only and is not intended to be limiting. As used herein, the singular forms "a," "an," and "the" can include both singular and plural referents, unless the context clearly dictates otherwise. In addition, "a number of," "at least one," and "one or more" (e.g., a number of memory devices) can refer to one or more memory devices, whereas a "plurality of" is intended to refer to more than one of such things. Furthermore, the words "can" and "may" are used throughout this application in a permissive sense (i.e., having the potential to, being able to), not in a mandatory sense (i.e., must). The term "include," and derivations thereof, means "including, but not limited to." The terms "coupled," and "coupling" mean to be directly or indirectly connected physically or for access to and movement (transmission) of commands and/or data, as appropriate to the context.

The figures herein follow a numbering convention in which the first digit or digits correspond to the figure number and the remaining digits identify an element or component in the figure. Similar elements or components between different figures can be identified by the use of similar digits. For example, 102 can reference element "02" in FIG. 1, and a similar element can be referenced as 202 in FIG. 2. As will be appreciated, elements shown in the various embodiments herein can be added, exchanged, and/or eliminated so as to provide a number of additional embodiments of the present disclosure. In addition, the proportion and/or the relative scale of the elements provided in the figures are intended to illustrate certain embodiments of the present disclosure and should not be taken in a limiting sense.

FIG. 1 is a functional diagram representing an apparatus including a processing device 102 in communication with a memory device 100 for virtual advertising based on physical location in accordance with a number of embodiments of the present disclosure.

The apparatus illustrated in FIG. 1 can be a server or a computing device (among others) and can include the processing device 102 (e.g., a processing resource). The apparatus can further include the memory device 100 (e.g., a non-transitory MRM), on which may be stored instructions, such as instructions 104, 106, 108. The device, in some examples, may be analogous to the device described with respect to FIG. 2 including processing device 202 and memory device 200. Although the following descriptions refer to a processing device and a memory device, the descriptions may also apply to a system with multiple processing devices and multiple memory devices. In such examples, the instructions may be distributed (e.g., stored) across multiple memory devices and the instructions may be distributed (e.g., executed by) across multiple processing devices.

The memory device 100 may be electronic, magnetic, optical, or other physical storage device that stores executable instructions. Thus, the memory device 100 may be, for example, non-volatile or volatile memory. In some examples, the memory device 100 is a non-transitory MRM comprising RAM, an Electrically-Erasable Programmable ROM (EEPROM), a storage drive, an optical disc, and the like. The memory device 100 may be disposed within a controller and/or computing device. In this example, the executable instructions 104, 106, 108 can be "installed" on the device. Additionally, and/or alternatively, the memory device 100 can be a portable, external or remote storage medium, for example, that allows the system to download the instructions 104, 106, 108 from the portable/external/remote storage medium. In this situation, the executable instructions may be part of an "installation package". As described herein, the memory device 100 can be encoded with executable instructions for sale of virtual advertising based on physical location.

The instructions 104, when executed by a processing device such as the processing device 102 can include instructions to detect a computing device within a first threshold radius of a first physical location and a second threshold radius of a first product. For instance, a user may enter a store at the first physical location. The user and their computing device (e.g., smart glasses, tablet, smartphone, smart watch, etc.) may be detected by being within a global positioning boundary associated with the first physical location (e.g., enter the store's global positioning system (GPS) boundaries), may be detected by being connected to a communication network associated with the first physical location (e.g., connect to the store's Wi-Fi), or may be recognized as within the first threshold radius of the first physical location in another manner.

The computing device can include a wearable computing device (e.g., smart glasses, smart watch, etc.) in some examples, and in some instances, the computing device can calculate a field of view of a user wearing the computing device based on eye position of the user, head orientation of the user, physical location of the user, or any combination thereof. The field of view, for instance, can include the extent of the observable world that is seen at any given moment. For instance, smart glasses may calculate the field of view of a user wearing the smart glasses and determine what products may be in the field of view and/or may display a virtual advertisement within that field of view.

In some examples, the processing device 102 can track the computing device using Wi-Fi tracking, video tracking, Bluetooth tracking, RFID tracking, or a combination thereof. This information can be used to determine location, products, and associated virtual advertisements. In some examples, the processing device 102 can track information processed by artificial intelligence (AI) in real time to determine other products to display via a different virtual advertisement to the user. For instance, AI may indicate that people purchasing shampoo are likely to purchase conditioner, so a virtual advertisement for a related conditioner product may be displayed as a user is shopping a shampoo aisle.

The user may approach the first product (e.g., cereal) within the first physical location (e.g., a grocery store). The computing device can be detected within the first threshold radius of the first physical location (e.g., within 10 feet of a store, within the Wi-Fi coverage of the store, etc.) and can then be detected within the second threshold radius of the first product (e.g., product within field of view, within 2 feet of product, etc.). The threshold radius, for instance, can be predetermined and/or or can vary by product and/or location.

Detection of the computing device within the first and/or the second threshold radius, for instance, can trigger the launching of a virtual advertisement. For example, the instructions 106, when executed by a processing device such as the processing device 102, can include instructions to display a virtual advertisement associated with the first product via a user interface of the computing device. The virtual advertisement may be displayed via the computing device utilizing AR and/or VR.

In a number of embodiments, AR can be used via the computing device through location services (e.g., GPS, gyroscope, accelerometer, etc.), one or more of the cameras, or a combination thereof. In some examples, one of the cameras can be used solely for AR purposes (e.g., an AR-specific camera). In a number of embodiments, one or more optical sensors can be used with one or more cameras for the AR, or in contrast, one or more optical sensors can be used instead of one or more cameras for the AR. AR can overlay virtual objects (e.g., virtual advertisements) on a real-world environment to mask a portion of the real-world environment and/or add to the real-world environment such that it is perceived as an immersive aspect of the real-world environment. In some examples, AR can display and/or automate a number of images and/or enhance an AR image to move and/or change on the user interface. For instance, the AR image can include an image of an object that resides in the real world but is enhanced by computer-generated perceptual information. The AR image (e.g., the virtual advertisement) can include information that is additive to the natural environment of the object or information that masks the natural environment. In some examples, the AR image can be perceived as an immersive aspect of the real environment (e.g., components of the virtual environment blend into a user's perception of the real word). For example, virtual advertisements associated with certain products may only be viewed and/or purchased while the user (and associated computing device) is physically within the threshold radius of the first physical location.

VR can include a simulated experience (e.g., via the computing device) to give a user an immersive feel of a virtual world (e.g., virtual advertisements within a store). In some examples mixed reality (MR) may be utilized in which physical (e.g., a product) and virtual (e.g., an advertisement) may coexist. Put another way, a VR system can be coupled with its real-world counterpart.

As noted, the virtual advertisement can be displayed, for instance, via AR, MR, or VR. For example, a user in the store may move between sections of the store, such as t-shirts, pants, accessories, etc. As the user travels through the store (e.g., to the second physical location), the virtual advertisements can change. When the user is in the t-shirt section, virtual advertisements may include sales of the t-shirts or sales of items related to the t-shirts (e.g., matching shorts), while hat sales, related sports apparel, sunglasses, etc. may be displayed as advertisements as the user moves to a location containing hats within the store. For instance, the processing device 102 can display a different virtual advertisement associated with a second product (e.g., sports apparel) based on the first product (e.g., hats). Similarly, the processing device 102 can provide a different virtual advertisement associated with a second product (e.g., sports apparel) via the user interface when the computing device is moved to a different, third physical location (e.g., sports section) within the first physical location.

Put another way, the processing device 102, in some examples, can provide a different advertisement via the computing device (e.g., a user interface) when the computing device moves to different locations within the first location. That is, as the user moves, new virtual advertisements can be displayed, for instance via AR or VR. The virtual advertisement can be removed responsive to the computing device leaving the second physical location or the threshold radius of the first physical location. For instance, as the user leaves a certain location of the store and/or leaves the store entirely, the virtual advertisements are removed.

The instructions 108, when executed by a processing device such as the processing device 102, can include instructions to provide the first product for sale via the user interface based on the virtual advertisement. For instance, if a user is within a threshold radius of a shirt, a virtual advertisement may be displayed for 20% off that particular shirt. A user may choose to purchase the first product via the user's computing device immediately (e.g., through a store application). For example, the virtual advertisement may offer the user a better deal if the user purchases while within the second threshold radius than if the user purchases the item outside of the second threshold radius.

Figure 2:
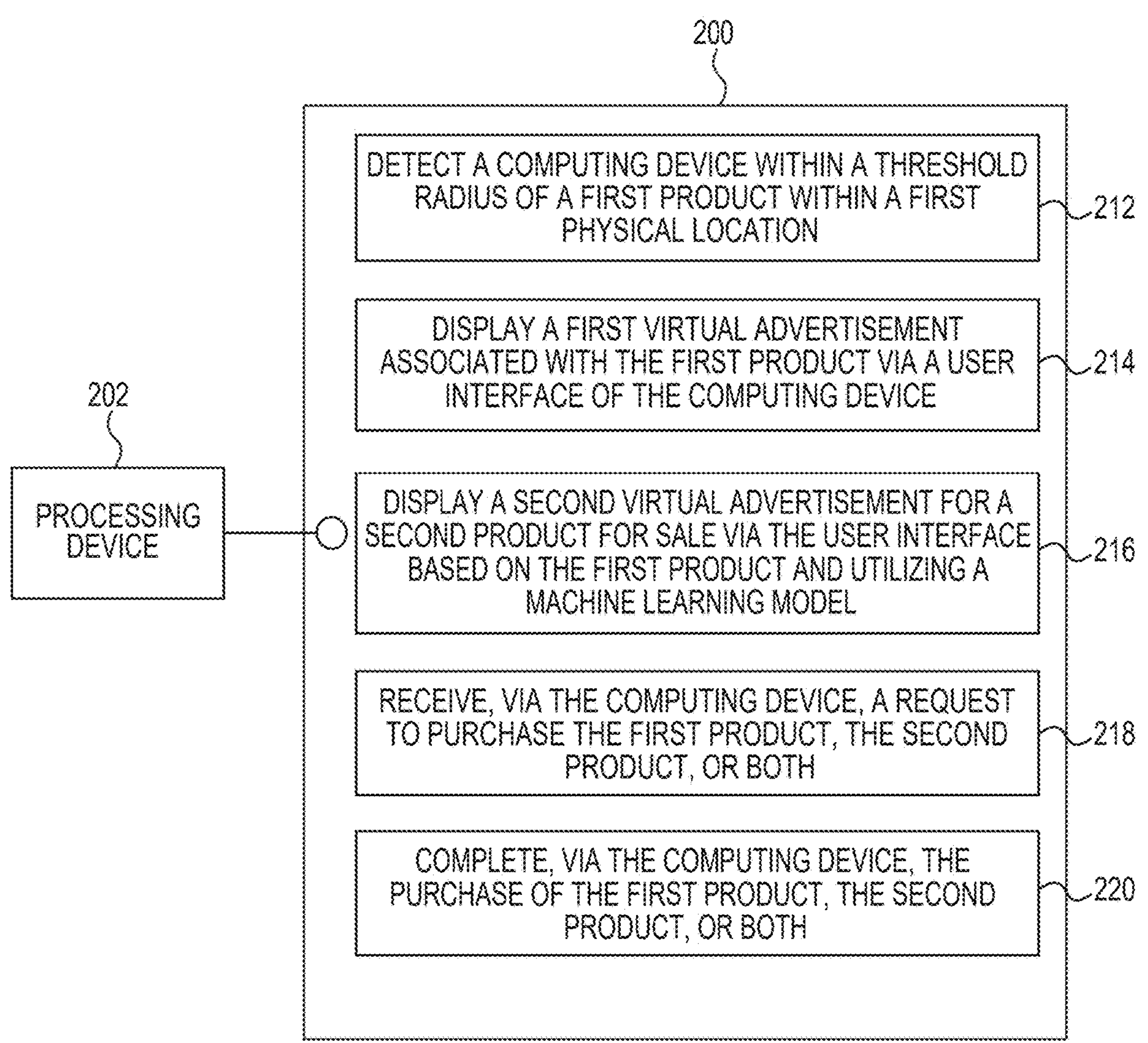
FIG. 2 is another functional diagram representing a processing device in communication with a memory device having instructions written thereon in accordance with a number of embodiments of the present disclosure.

FIG. 2 is another functional diagram representing a processing device 202 in communication with a memory device 200 having instructions 212, 214, 216, 218, 220 written thereon in accordance with a number of embodiments of the present disclosure. In some examples, the processing device 202 and the memory device 200 comprise a device or apparatus and may be analogous to the processing device 102 and the memory device 200 illustrated in FIG. 1.

The instructions 212, when executed by a processing device such as the processing device 202, can cause detect a computing device within a threshold radius of a first product within a first physical location. For instance, a user (and their computing device) can enter the first physical location (e.g., a sporting event, a store, a festival, etc.) or come within the threshold radius. The detection, for instance, may come from connection of the computing device to a communication network associated with the first physical location (e.g., a Wi-Fi network) and/or the computing device entering GPS boundaries of the first location, for example.

In some examples, a prompt can be provided to the computing device to display virtual advertisements via the user interface of the computing device responsive to detection of the computing device within the threshold radius. The virtual advertisements may not be displayed in response to a denial response from the user to the prompt. Should the user accept the prompt, the virtual advertisements can be launched. For instance, the instructions 214, when executed by a processing device such as the processing device 202, can cause the display of a first virtual advertisement associated with the first product via a user interface of the computing device. In an example, the first product may be a particular vehicle for sale at a car dealership (e.g., first physical location). The virtual advertisement may be presented, for instance, via AR, such that the virtual environment is an overlay of the first physical location. In other examples, the virtual advertisement may be displayed via VR or MR.

For instance, if the user is at the car dealership, the virtual advertisement may include an advertisement specific to the particular vehicle (e.g., the first product), accessories for the vehicle, or other vehicles either in different locations of the car dealership or not physically present at the car dealership. For example, the instructions 216, when executed by a processing device such as the processing device 202 can include instructions executable to cause display (e.g., via AR, VR, MR, etc.) of a second virtual advertisement for a second product for sale via the user interface based on the first product and utilizing a machine learning model. In the car dealership example, the user may be viewing a red convertible (e.g., first product), and an advertisement for a blue convertible elsewhere at the car dealership (e.g., second product in a second physical location within the first physical location) may be displayed. Additionally or alternatively, the machine learning model may indicate that users who are interested in convertibles are interested in particular accessories, and those accessories (e.g., second product) can be displayed via a virtual advertisement to the user. The accessories, in some instances, may be located in a second (e.g., different) physical location outside of the first physical location. For instance, the car dealership may have an accessories store located somewhere other than the car dealership. In such examples, the second product (e.g., the accessories) may be available online for purchase.

In some examples, inventory may be expanded by a merchant, for instance, by displaying virtual advertisements for products in a warehouse or other inventory not on a showroom floor. A user may purchase these products based on recommendations related to the products within their field of view (e.g., different colors, sizes, styles, etc.). Similarly, virtual products (e.g., metaverse products) may be offered via the virtual advertisements.

In some examples, the memory resource 200 has instructions executable to provide the virtual advertisement responsive to a purchase of an associated product in the first physical location. For instance, at a special event, such as a store opening event, a user may purchase a particular product (e.g., logo t-shirt, etc.), and in response a virtual advertisement for an exclusive related product may be displayed.

The instructions 218, when executed by a processing device such as the processing device 202, can facilitate receipt, via the computing device, of a request to purchase the first product, the second product, or both. For instance, a user may choose to purchase a swimsuit top (e.g., the first product) and/or a swimsuit bottom (e.g., the second product) via the computing device. In some examples, the advertised price may only be available if purchased via the computing device while within a threshold distance of the first product. In some examples, the second product may not be available in-store (e.g., in the first physical location), and may be offered as a purchase via the computing device.

The instructions 220, when executed by a processing device such as the processing device 202, can cause completion, via the computing device, of the purchase of the first product, the second product, or both. For instance, the purchase can be completed utilizing different payment methods including a digital currency, a fiat currency, etc. For instance, the user may choose to purchase the swimsuit top and the swimsuit bottom while at a store. The user can purchase the swimsuit bottom using virtual currency while purchasing the swimsuit top using fiat currency (e.g., a credit card). Other combinations of currency may be used, for instance fiat currency may be used for both, among other payment combinations.

Figure 3:
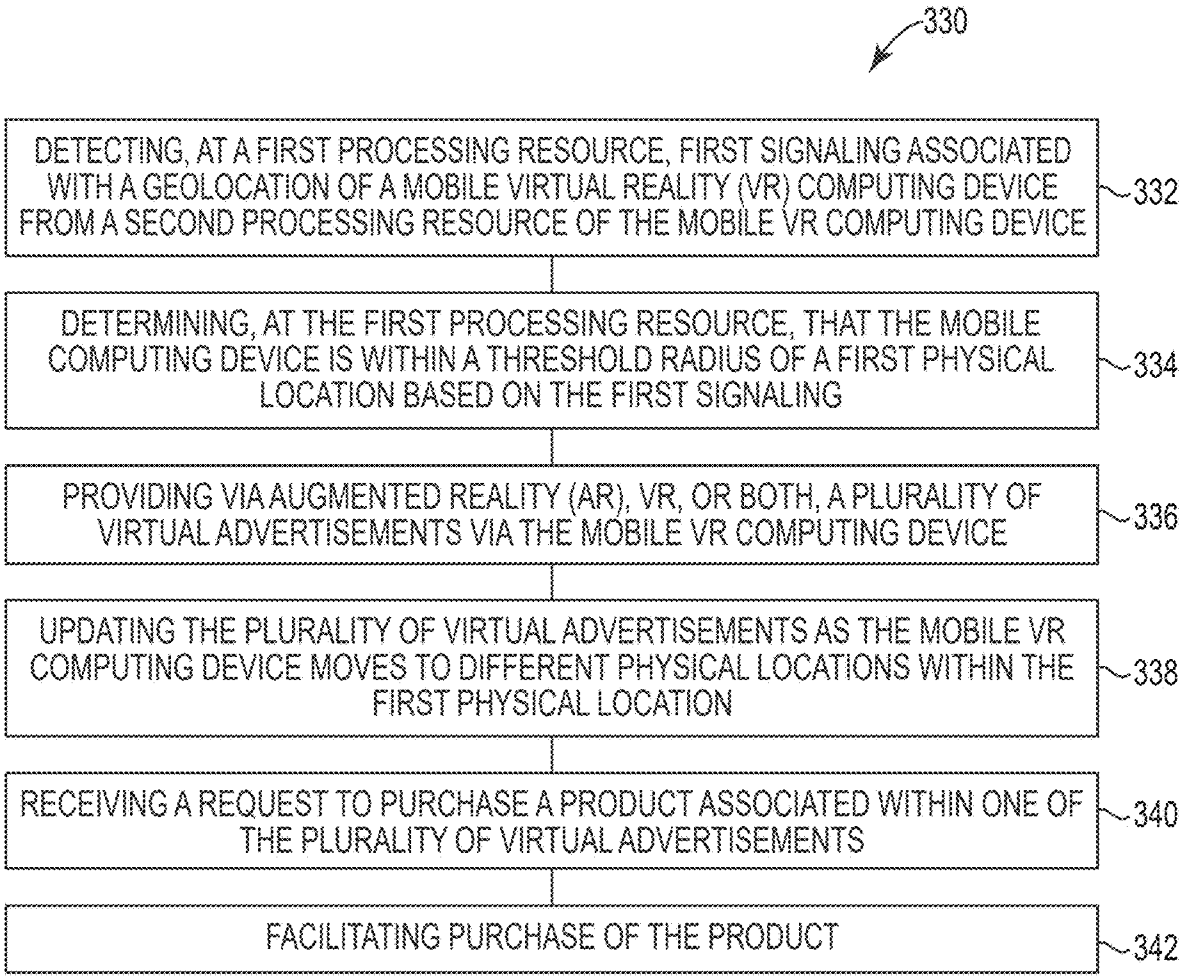
FIG. 3 is a flow diagram representing an example method for virtual advertising based on physical location in accordance with a number of embodiments of the present disclosure.

FIG. 3 is a flow diagram representing an example method 330 for virtual advertising based on physical location in accordance with a number of embodiments of the present disclosure. The method 330 may be performed, in some examples, using a device such as those described with respect to FIGS. 1 and 2.

The method 330 can include the display of virtual advertisements based on physical location, which can improve targeted marketing and customer satisfaction by targeting a user with relevant virtual advertisements based on the particular physical location of the user, products within a threshold radius of the user, and/or related products.

At 332, the method 330 can include detecting, at a first processing resource, first signaling associated with a geolocation of a mobile computing device from a second processing resource of the mobile computing device. For instance, a location of a user and their associated mobile computing device (e.g., smart glasses, smartphone, tablet, smart watch, etc.) can be identified using digital information processed via the internet. Examples can include network connections (e.g., Wi-Fi connections), GPS boundaries, network identifiers (e.g., IP addresses), and radio frequency identifiers, among others.

The method 330, at 334, can include determining, at the first processing resource, that the mobile computing device is within a threshold radius of a first physical location based on the first signaling. For instance, when the user and the mobile computing device enter or come within range of the first physical location, the user may be exposed to virtual advertisements. For instance, at 336, the method 330 can include providing via AR, VR, or both, a plurality of virtual advertisements via the mobile VR computing device.

The virtual advertisements can be associated with an item or items within a threshold radius of the first location. For instance, if a user walks towards a big box store, a virtual advertisement may appear including a general advertisement for the store or an advertisement for a particular product, among others. For instance, if the user frequently purchases groceries at the store, machine learning may be utilized to determine this, and a virtual advertisement displaying certain grocery sales may be displayed. In some examples, the virtual advertisement can be displayed as an overlay of the first physical location. For instance, a virtual advertisement in a sporting goods department may overlay portions of the department with virtual advertisements of people using the sporting goods.

The method 330 can include, for instance, making recommendations to a user based on a product currently being viewed. For instance, the method can 330 can include recognizing, at the first processing device, the product and providing, via the mobile VR computing device, a recommendation for a related product based on the recognition of the product. For instance, a user shopping in a marshmallow section may be provided recommendations and/or virtual advertisements associated with graham crackers and chocolate. A user shopping in a baking section may be provided recipe recommendations or completed cookies that may be baked using the baking products. In some instances, prices and locations of other relevant ingredients or associated products may be displayed. Dynamic pricing, in some instances, may be offered for purchasing product B after purchasing product A.

At 338, the method 330 can include updating the plurality of virtual advertisements as the mobile VR computing device moves to different physical locations within the first physical location. Updating can include, for instance, adding and removing virtual advertisements based on the mobile computing device being in the different physical locations within the first physical location. Put another way, a displayed virtual advertisement of the plurality of virtual advertisements can be removed responsive to the mobile VR computing device leaving the threshold radius of the first physical location.

For example, if the user is in the big box store in the candy section, virtual advertisements associated with candy may be displayed, but as the user moves towards a clothing section, virtual advertisements associated with candy can be removed and virtual advertisements associated with clothing can be added.

At 340, the method 330 can include receiving a request to purchase a product associated within one of the plurality of virtual advertisements. The user can indicate their desire to purchase the product, and the method 330, at 342 can include facilitating purchase of the product. This can include, for instance, accepting a same payment format for the product associated with the virtual advertisement and a physical good or accepting different payment formats for the product associated with the virtual advertisement and the physical good.

In response to a user purchasing the first product in the first location, a different product may be offered for sale. For example, if the user purchases a tent, a virtual advertisement for bug spray, lanterns, or other camping material may be displayed. In some examples, if the user is offered a virtual advertisement for a different product (whether the first product was or was not purchased), directions may be displayed to the user with respect to finding the other product. For instance, if a tennis racquet is viewed and/or purchased, a virtual advertisement for tennis balls and directions to find them in the store may be displayed.

Figure 4:
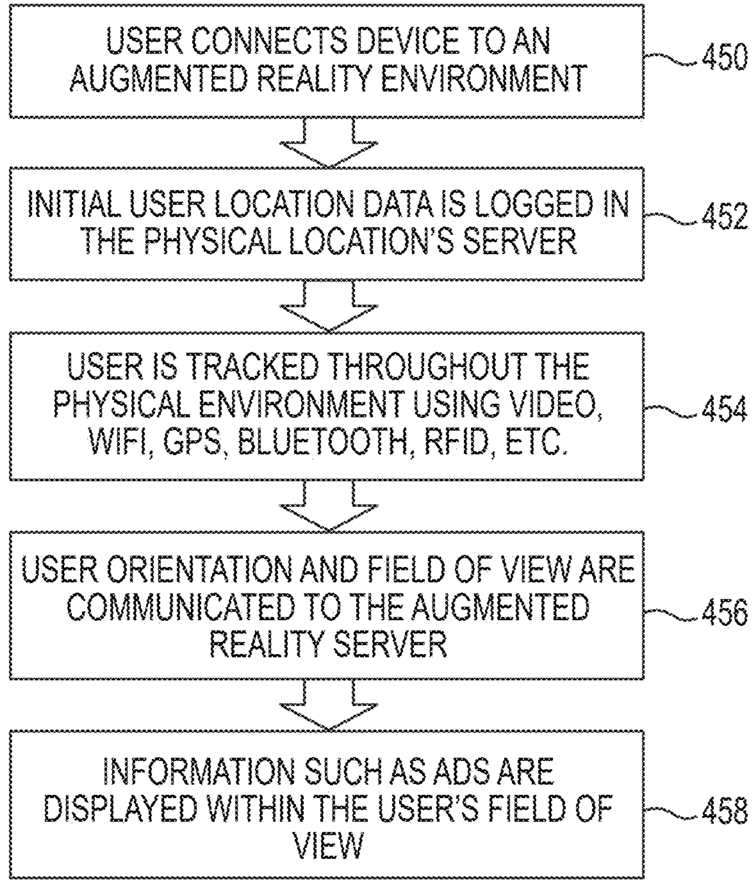
FIG. 4 is another flow diagram representing an example method for virtual advertising based on physical location in accordance with a number of embodiments of the present disclosure.

FIG. 4 is another flow diagram representing an example method for virtual advertising based on physical location in accordance with a number of embodiments of the present disclosure. The example method may be performed, in some examples, using a device such as those described with respect to FIGS. 1 and 2.

At 450, a user can connect a device, such as a mobile device, smart glasses, smart watch, etc. to an AR environment (or VR, MR, etc.). For instance, a user wearing smart glasses may turn those smart glasses on. Initial user location data can be logged, at 452, in an AR (or VR, MR, etc.) server of the physical location. The physical location, for instance, may include a shopping mall, a clothing store, a grocery store, a home goods store, among a plurality of other merchants. At 454, the user can be tracked throughout the physical environment using a plurality of devices/techniques including video, Wi-Fi, GPS, Bluetooth, RFID, etc. While the user moves about the physical location, user orientation and field of view can be communicated to the AR server. Based on the orientation and field of view information, virtual advertisements, suggestions for products, etc. can be displayed, at 458, within the user's field of view.

For instance, a business owner can create virtual advertisements that can only be viewed and/or redeemed when a user (e.g., customer) is physically in their business. When the user enters the GPS boundaries of the business, connects to the business' Wi-Fi, etc., using a VR, AR, or MR-capable computing device, the virtual advertisements of the business can be displayed to the user via a user interface of the computing device.

The user can physically move around the business and view virtual advertisements in addition to physical goods and products in the business. The virtual advertisements displayed can change as the user moves by interfacing the computing device and tracking the user's location within the business. For instance, a user may see a virtual advertisement for a sale or recommendation for shoes alongside physical socks, but as the user moves to an outdoor section of the business, virtual advertisements for coats may be displayed alongside physical outdoor gear for the user.

Figure 5A:
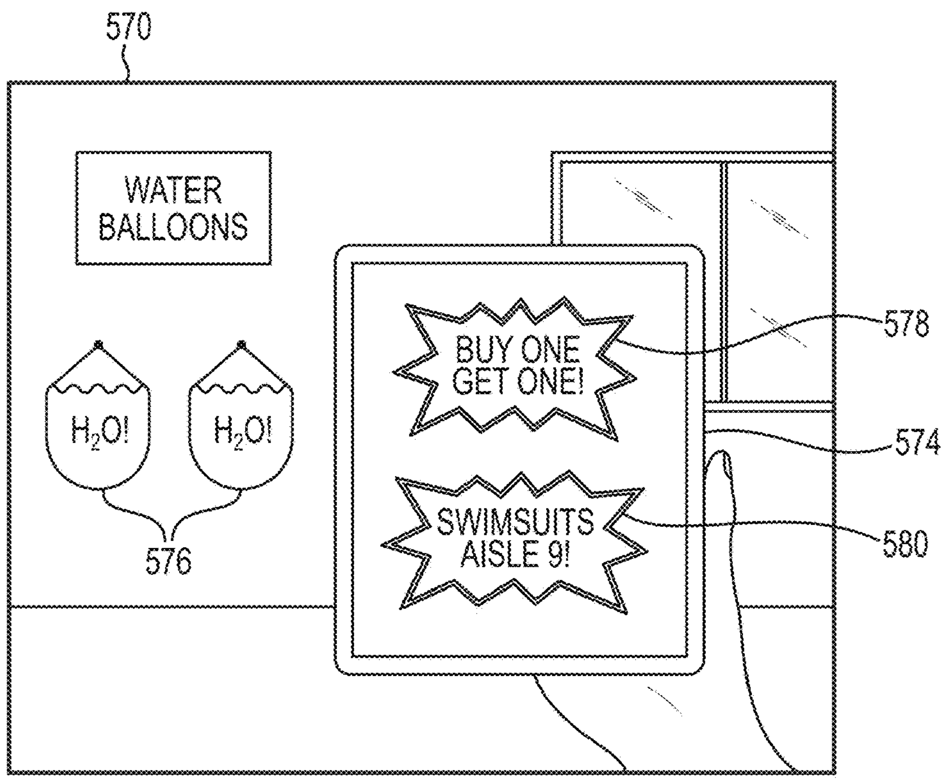
FIG. 5A illustrates an example of a virtual advertisement displayed via a computing device in accordance with a number of embodiments of the present disclosure.

FIG. 5A illustrates an example of a virtual advertisement 578, 580 displayed via a computing device 574 in accordance with a number of embodiments of the present disclosure. The computing device 574 may be a mobile device of a user and may have AR, VR, and/or MR capabilities. The user and the computing device 574 may enter a first physical location, such as a retail store. The computing device 574 may be detected and a virtual advertisement 578, 580 triggered, for instance when the computing device 574 connects to a wireless network of the first physical location. In some examples, the computing device 574 may be detected and a virtual advertisement 578, 580 triggered, for instance when the computing device 574 enters a GPS boundary of the first physical location.

For example, a user may be shopping in a store near water balloons 576. As the user (e.g., the user's device 574) is detected within a threshold radius of the water balloons 576, virtual advertisements 578 and 580 may be displayed via computing device 574. For instance, virtual advertisement 578 may indicate the water balloons 576 are on a "buy one, get one" free sale. Because the user is viewing the water balloons 576, the virtual advertisement 580 may also be displayed suggesting swimsuits and providing a location for the swimsuits. These virtual advertisements may encourage the user to purchase the balloons 576 because of the sale and/or a swimsuit because it is associated with the balloons 576.

The virtual advertisements 578, 580 displayed may change as the user and the computing device 574 move through the first physical location. For instance, a user may move to a camping section of a retail store, and the virtual advertisements 578, 580 displayed may change to tents, lanterns, etc. in the user's field of view.

In some examples, a machine learning model may be utilized to determine what virtual advertisements and suggestions may be helpful to a user within the field of view of the water balloons 576. For instance, based on the user and other users' shopping history, as well as public data, machine learning models may be utilized to determine which virtual advertisements to display to a particular user.

Figure 5B:
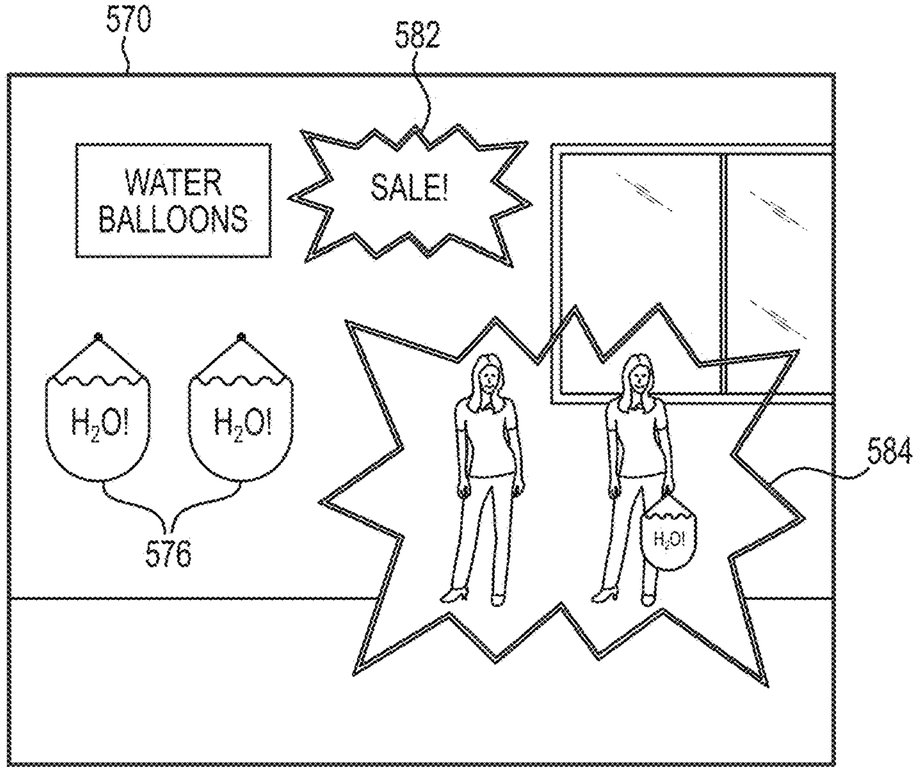
FIG. 5B illustrates another example of a virtual advertisement displayed via AR of a computing device in accordance with a number of embodiments of the present disclosure.

FIG. 5B illustrates another example of a virtual advertisement 582, 584 displayed via AR of a computing device in accordance with a number of embodiments of the present disclosure. The computing device 574 may be a mobile device of a user and may have AR, VR, and/or MR capabilities. The user and the computing device 574 may enter a first physical location, such as a retail store. The computing device 574 may be detected and a virtual advertisement 582, 584 triggered, for instance when the computing device 574 connects to a wireless network of the first physical location. In some examples, the computing device 574 may be detected and a virtual advertisement 582, 584 triggered, for instance when the computing device 574 enters a GPS boundary of the first physical location.

For example, a user may be shopping in a store near water balloons 576. As the user (e.g., the user's AR-capable device) is detected within a threshold radius of the water balloons 576, virtual advertisements 582 and 584 may be displayed via AR. For instance, virtual advertisement 582 may appear as an overlay of the real environment surrounding the water balloons 576 and may indicate the water balloons 576 are on sale. Because the user is viewing the water balloons 576, the virtual advertisement 584 may also be displayed illustrating people having fun playing with water balloons. These virtual advertisements may encourage the user to purchase the balloons 576 because of the sale and/or because of the fun that can be had playing with the balloons 576.

The virtual advertisements 582, 584 displayed may change as the user and the computing device 574 move through the first physical location. For instance, a user may move to a camping section of a retail store, and the virtual advertisements 582, 584 displayed may change to tents, lanterns, etc. in the user's field of view and/or people enjoying camping with the products.

In some examples, a machine learning model may be utilized to determine what virtual advertisements and suggestions may be helpful to a user within the field of view of the water balloons 576. For instance, based on the user and other users' shopping history, as well as public data, machine learning models may be utilized to determine which virtual advertisements to display to a particular user.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and processes are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A wearable computing device, comprising:
a memory device; and
a processing device communicatively coupled to the memory device, wherein the processing device is configured to:
determine the wearable computing device is within a first threshold radius of a first physical location and within a second threshold radius of a first product for sale and within the first physical location;
calculate a field of view of a user wearing the wearable computing device, including an extent of an observable world that is seen at any given moment by the user based on eye position of the user, head orientation of the user, physical location of the user, or any combination thereof;
track a location of the wearable computing device using video recognition, Wi-Fi, Bluetooth, radio frequency identification (RFID), or a combination thereof;
provide to an augmented reality (AR) server, the field of view in real time as the wearable computing device moves about the first physical location;
display a virtual advertisement associated with the first product via a user interface and within the field of view of the wearable computing device;
provide the first product for sale via the user interface based on the virtual advertisement; and
track information including the tracked location and the field of view processed by artificial intelligence (AI) in real time to determine other related products to display via a different virtual advertisement to the user.

2. The wearable computing device of claim 1, further comprising the processing device to display a different virtual advertisement associated with a second product based on the first product.

3. The wearable computing device of claim 1, wherein the processing device is configured to provide a different virtual advertisement associated with a second product via the user interface when the computing device is moved to a different, third physical location within the first physical location.

4. The wearable computing device of claim 1, further comprising the processing device to track information processed by artificial intelligence (AI) in real time to determine other products to display via a different virtual advertisement to the user.

5. The wearable computing device of claim 1, configured to display a different virtual advertisement for a virtual product associated with the first product.

6. A non-transitory machine-readable medium comprising a processing resource in communication with a memory resource having instructions executable to:
detect a wearable computing device within a first threshold radius of a first product within a first physical location and within a second threshold radius of the first physical location;
calculate a field of view of a user wearing the wearable computing device, including an extent of an observable world that is seen at any given moment by the user based on eye position of the user, head orientation of the user, physical location of the user, or any combination thereof;
track a location of the wearable computing device using video recognition, Wi-Fi, Bluetooth, radio frequency identification (RFID), or a combination thereof;
provide to an augmented reality (AR) server, the field of view in real time as the wearable computing device moves about the first physical location;
display a first virtual advertisement associated with the first product via a user interface and within the field of view of the wearable computing device;
display a second virtual advertisement for a second product for sale via the user interface and within the field of view of the wearable computing device based on the first product and utilizing a machine learning model;
receive, via the computing device, a request to purchase the first product, the second product, or both;
complete, via the computing device, the purchase of the first product, the second product, or both; and
track information including the tracked location and the field of view processed by artificial intelligence (AI) in real time to determine other related products to display via a different virtual advertisement to the user.

7. The medium of claim 6, wherein the second product is in a second physical location within the first physical location.

8. The medium of claim 6, wherein the second product is in a second physical location outside of the first physical location.

9. The medium of claim 6, wherein the second product is available online for purchase.

10. The medium of claim 6, further comprising the instructions executable to display the first and the second virtual advertisements via AR, virtual reality, or both.

11. A method, comprising:
detecting, at a first processing resource, first signaling associated with a geolocation of a wearable mobile virtual reality (VR) computing device from a second processing resource of the wearable mobile VR computing device;
determining, at the first processing resource, that the wearable mobile VR computing device is within a first threshold radius of a first product for sale within a first physical location and within a second threshold radius of the first physical location based on the first signaling;
calculating a field of view of a user wearing the wearable mobile VR computing device, including an extent of an observable world that is seen at any given moment by the user based on eye position of the user, head orientation of the user, physical location of the user, or any combination thereof;
tracking a location of the wearable computing device using video recognition, Wi-Fi, Bluetooth, radio frequency identification (RFID), or a combination thereof;
providing to an augmented reality (AR) server, the field of view in real time as the wearable computing device moves about the first physical location;
providing via AR, VR, or both, and within the field of view, a plurality of virtual advertisements associated with the first product via the mobile VR computing device;
updating the plurality of virtual advertisements as the mobile VR computing device moves to different physical locations within the first physical location;
receiving a request to purchase the first product associated with one of the plurality of virtual advertisements;

facilitating purchase of the first product; and tracking information including the tracked location and the field of view processed by artificial intelligence (AI) in real time to determine other related products to display via a different virtual advertisement to the user.

12. The method of claim 11, further comprising removing a displayed virtual advertisement of the plurality of virtual advertisements responsive to the mobile VR computing device leaving the first threshold radius.

13. The method of claim 11, further comprising providing a different product for sale responsive to a purchase of the first product.

14. The method of claim 11, further comprising displaying a virtual advertisement of the plurality of virtual advertisements as an overlay of the first physical location.

15. The method of claim 11, further comprising displaying directions to a different product within the first physical location based on the first product and the plurality of virtual advertisements.

16. The method of claim 11, further comprising:

recognizing, at the first processing device, the product; and providing, via the mobile VR computing device, a recommendation for a related product based on the recognition of the first product.

* * * * *